Sept. 28, 1965  K. W. TANTLINGER ETAL  3,208,608
DOCK SYSTEM
Filed May 31, 1963  2 Sheets-Sheet 1
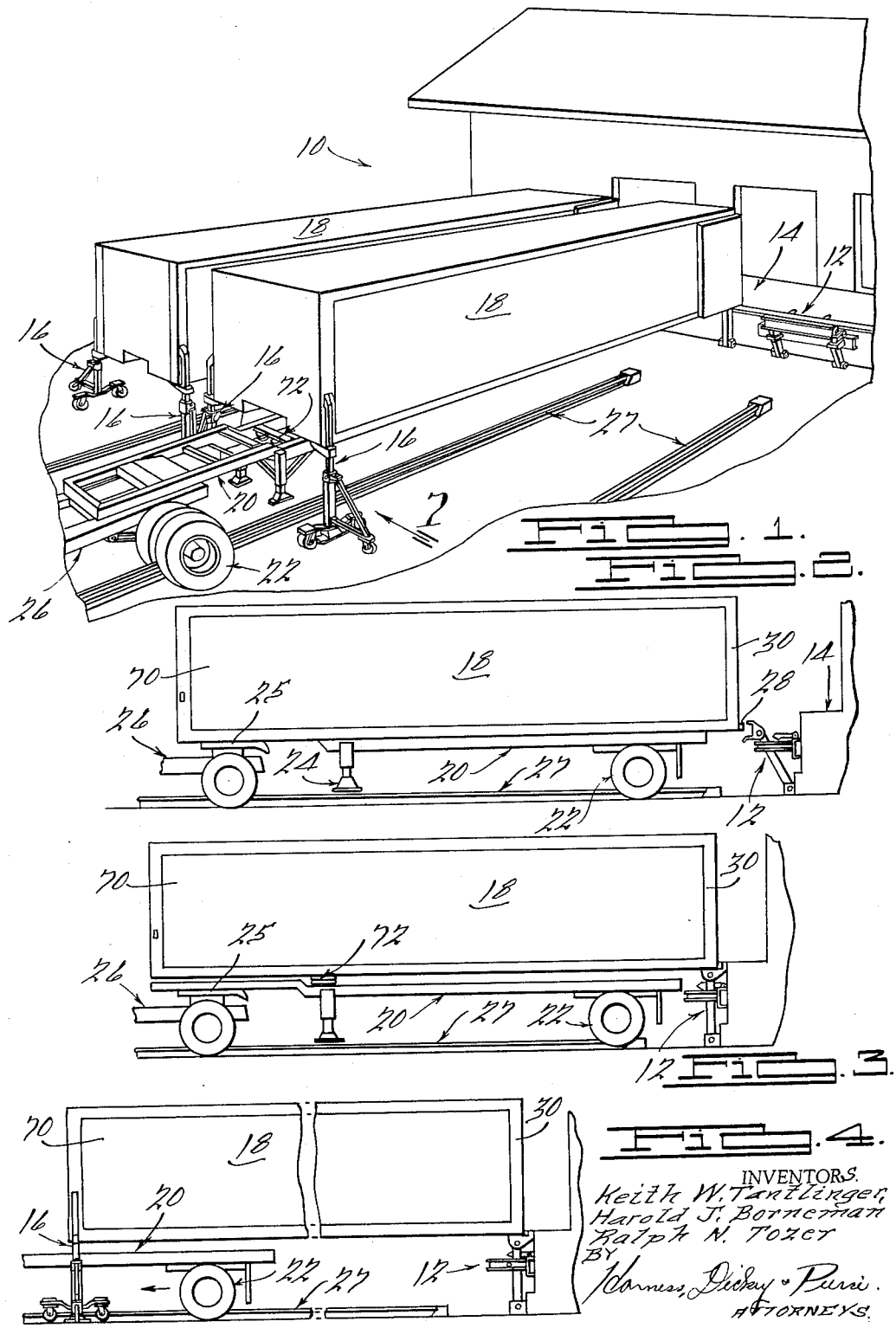

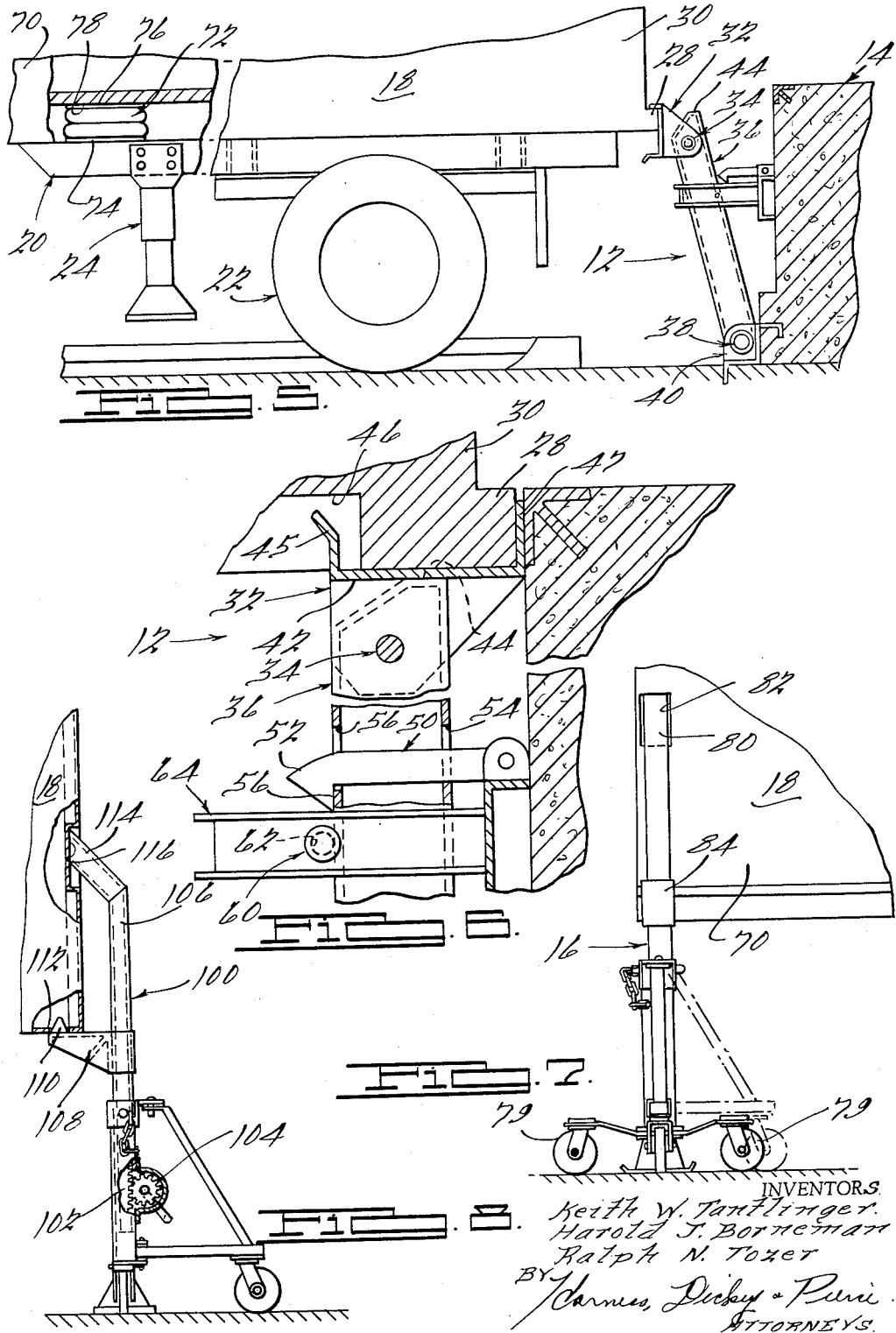

United States Patent Office

3,208,608
Patented Sept. 28, 1965

3,208,608
DOCK SYSTEM
Keith W. Tantlinger, Grosse Pointe Shores, and Ralph N. Tozer and Harold J. Borneman, Detroit, Mich., assignors to Fruehauf Corporation, Detroit, Mich., a corporation of Michigan
Filed May 31, 1963, Ser. No. 284,556
3 Claims. (Cl. 214—38)

This invention relates generally to materials handling systems and more particularly to an improved dock system that promotes efficient loading and unloading of shipping containers and the like.

The advent of the modular shipping container that is readily transferable between various types of vehicles, for example, rail cars, highway trailers, ships, aircraft etc., has created the need for an efficient dock system that eliminates the need for tieing up, for example, a highway vehicle incident to loading or unloading of the container.

It often occurs that such containers arrive at a dock facility after working hours or at a time when dock personnel other than the driver of a highway vehicle are unavailable. Thus, one of the basic requirements of such a dock system is that the containers must be positionable relative to the dock facility solely by the operator of a highway vehicle. In addition, it is desirable that tractive effort of the vehicle be used to effect such positioning. Further, the dock system should be constructed so that critical alignment of the shipping container relative thereto is unnecessary and that such positioning as is necessary is relatively automatic upon movement of the container towards the dock facility.

An additional requirement is that the hardware employed to elevate and support the containers relative to a highway vehicle be relatively inexpensive so that the dock system does not become prohibitively expensive.

Accordingly, one object of the instant invention is an improved dock system.

Another object is a dock system that requires only the operator of the vehicle that delivers a container to condition the container for loading or unloading.

Another object is a dock system that effects positioning of a shipping container on movement of a highway vehicle and shipping container towards the dock facility.

Another object is a dock facility that effects positioning of a shipping container in a loading or unloading condition due to tractive effort of the vehicle that delivers the container to the dock facility.

Another object is a dock facility that employs relatively simple and rugged equipment to effect support of a shipping container.

Other objects and advantages of the instant invention will be apparent from the following description, claims and drawings, wherein:

FIGURE 1 is a perspective view of a dock system in accordance with an exemplary constructed embodiment of the instant invention;

FIG. 2 is a side plan view of a shipping container surmounted on a trailer chassis in the ready-to-couple condition relative to a loading dock;

FIG. 3 is a view similar to FIG. 2 showing the shipping container at an intermediate stage of positioning relative to the dock facility;

FIG. 4 is a view similar to FIG. 3 showing the shipping container in a loading or unloading condition with the trailer partially retracted from under the container;

FIG. 5 is a fragmentary enlarged side view of the pole vault and lift mechanism of the dock system;

FIG. 6 is a fragmentary enlarged view, of the pole vault shoe, partially broken away for clarity;

FIG. 7 is a view taken substantially in the direction of the arrow 7 of FIG. 1; and FIG. 8 is a side view of a modified front support for the shipping container.

A dock system in accordance with the instant invention satisfies the foregoing requirements in that shipping containers are positionable relative to an elevating mechanism upon movement thereof toward a loading dock. Coupling of the shipping container to the dock facility is effected through tractive effort of the highway vehicle that delivers the container to the dock facility. Coupling of the container to the dock facility can be accomplished by the operator of the highway vehicle without requiring additional personnel. The hardware employed to effect positioning and support of the shipping containers incident to loading and unloading is relatively inexpensive and rugged in construction.

As best seen in FIG. 1 of the drawings a dock system 10, in accordance with an exemplary constructed embodiment of the instant invention, comprises what may be termed a pole vault mechanism 12 mounted on, for example, an elevated loading platform 14, and a plurality of front supports 16 for shipping containers 18 or the like. The containers 18 are preferably of the type shown in application Serial Number 112,635, now Patent No. 3,132,-883, for Shipping Apparatus, which is assigned to the assignee of the instant invention.

As best seen in FIGS. 2, 3 and 4 of the drawings the shipping container 18 is supported on a chassis 20 having a rear suspension 22 and landing gear 24. The chassis 20 is provided with a conventional king-pin (not shown) to facilitate attachment to a fifth wheel 25 on a conventional tractor 26.

As the chassis 20 and container 18 move rearwardly towards the loading dock 14 they are guided into lateral alignment with the pole vault mechanism 12 by a rail 27 that engages the wheel suspension 22 of the chassis 20. A lower rail 28 on a rear end 30 of the container 18 is vertically aligned with a complementary shoe 32 on the pole vault mechanism 12, the shoe 32 being mounted for rotation about a horizontal axis on a pair of pins 34 that extend through a pair of upwardly extending arms 36, respectively. The arms 36 are mounted for rotation about a horizontal axis on suitable pins 38 which are supported on suitable base plates 40.

As the rail 28 on the container 18 engages the shoe 32, the shoe 32 pivots clockwise, as seen in FIG. 5 of the drawings, until a lower flange 42 thereof seats on upper edge faces 44 of the arms 36. Further rearward movement of the container 18 due to the backing of the tractor 28 pivots the arms 36 clockwise about the pins 38 effecting elevation of the shoe 32 and rearward end 30 of the container 18.

It is to be noted that, as seen in FIG. 6, a frontal flange 45 on the shoe 32 is accepted in a recess 46 in the bottom of the container 18. Also, the rail 28 is positioned against a rear flange 47 on the shoe 32. Thus, the container 18 is positively retained against longitudinal movement by the shoe 32 in conjunction with the arms 36.

As best seen in FIG. 6 of the drawings each of the arms 36 is provided with a forwardly extending latch 50 having a spear shaped front end portion 52 that is accepted in complementary apertures 54 and 56 therein as it rotates about the pin 38. When the arm 36 is in a substantially vertical position the end portion 52 of the associated latch 50 drops over a latching surface 56 on the arm 36 to retain the arm 36 in the vertical condition and therefore the rear end 30 of the container 18 in an elevated condition. A suitable safety pin 60 is insertable through a complementary aperture 62 in a retainer frame 64 of the pole vault mechanism 12 to lock the arm 36 in the vertical condition.

After the rear end 30 of the container 18 is coupled to the pole vault mechanism 12, a front end portion 70 of the container 18 is elevated relative to the chassis 20 by a novel lift system comprising an inflatable air bag 72 that is supported on a suitable transverse plate 74 on the chassis 20. The air bag 72 has a top plate 76 (FIG. 5) that is engageable with a lower face 78 on the container 18 so that, upon inflation of the air bag 72 the container 18 is elevated to the condition shown in FIG. 3.

As best seen in FIGS. 3 and 7, when the container 18 is elevated to the condition shown therein, a suitable front support 16 is interposed under the container 18. The front support 16 is preferably provided with self-stabilizing resiliently supported wheels 79 of the type more particularly disclosed in application Serial Number 260,695 for Support Legs, filed February 25, 1963, which is assigned to the assignee of the instant invention. The support 16 has an upper end 80 that is accepted in a complementary recess 82 in the container 18 and a lower support bracket 84 that engages under the container 18.

When the container 18 is fully supported by the pole vault mechanism 12 and front support 16, as shown in FIG. 4, the air bag 72 on the chassis 20 is deflated conditioning the chassis 20 for withdrawal from under the container 18. The container 18 is then positioned relative to the loading dock 14 for loading or unloading.

As best seen in FIG. 8 of the drawings a modified front support 100 is provided with a suitable rack 102 and gear 104 to effect elevation of an upper end portion 106 thereof. The upper end portion 106 has a suitable lower support bracket 108 with a detent 110 thereon that is accepted in a complementary aperture 112 in the container 18. The upper end portion 106 of the support 100 has a terminal end portion 114 that is engageable in a complementary recess 116 in the container 18. The front support 100 renders the dock system 10 practical for use with a conventional trailer chassis not having the air bag lift for the container 18 discussed hereinbefore, in that elevation of the front end of the container 18 relative to the trailer chassis is effected by rotation of the gear 104.

From the foregoing description it should be apparent that the dock system of the instant invention provides a relatively simple and inexpensive solution to the problem of supporting shipping containers and the like at a dock facility independently of the vehicle used to transport the container to the facility. The containers are positionable relative to the dock solely by the vehicle operator using tractive effort of the delivering vehicle. The container is laterally aligned relative to the dock facility by a lower rail that guides the rear wheel suspension of the vehicle as it moves toward the dock. Engagement of the container with a pole vault mechanism on the dock is fully automatic. Elevation of the container relative to the vehicle chassis is also relatively easily accomplished either by a fluid actuator or manually. In addition the container is automatically locked in the elevated condition relative to the chassis. The front supports are portable to maximize the flexibility of the dock system.

It is to be understood that the specific construction of the improved dock system herein disclosed and described is presented for the purpose of explanation and illustration and is not intended to indicate limits of the invention, the scope of which is defined by the following claims.

What is claimed is:

1. A dock system for conditioning a shipping container for loading and unloading independently of a supporting vehicle, said system comprising
   a loading dock,
   a pole vault mechanism supported by said dock and engageable with one end of the shipping container to effect elevation thereof,
   means on the vehicle engageable with the other end of the container to effect elevation thereof relative to the vehicle, and
   support means engageable with the other end of the container to retain it in said elevated condition when said vehicle and elevating means are withdrawn from under the container.

2. A dock system for supporting a shipping container having a laterally extending lower rail in a loading and unloading condition, said system comprising
   a loading dock,
   a pole vault arm pivotally supported by said dock,
   a generally U-shaped shoe pivotally supported on an upper end of said arm and engageable under the rail on the shipping container,
   means engageable with the other end of the container to effect elevation thereof relative to the vehicle, and
   support means engageable with the other end of the container to retain it in said elevated condition.

3. A dock system for supporting a shipping container for loading and unloading independently of a supporting vehicle having a rear wheel suspension, said shipping container having a laterally extending lower rear rail,
   a loading dock,
   means for moving said vehicle towards said dock,
   a pole vault mechanism rotatably supported by said dock, said pole vault mechanism comprising an upwardly extending arm having a lower end pivotally secured to said dock, said arm having a generally U-shaped shoe pivotally supported on an upper end thereof and engageable with the lower rear rail on the shipping container to effect elevation thereof, movement of said vehicle and container towards said dock effecting rotation of said shoe relative to said arm to engage the bight portion thereof under the rear rail on the container, further rearward movement of the container effecting rotation of said arm to effect elevation of the rear end of the container,
   means on the vehicle engageable with the other end of the container to effect elevation thereof relative to the vehicle, and
   support means engageable with the other end of the container to retain it in said elevated condition when said vehicle and elevating means are withdrawn from under the container.

References Cited by the Examiner

UNITED STATES PATENTS

| 906,349 | 12/08 | Wilson | 254—49 |
| 1,425,965 | 8/22 | Hocke | 214—515 |
| 1,602,146 | 10/26 | Callison. | |
| 1,687,503 | 10/28 | McKee | 254—94 |
| 2,693,889 | 11/54 | Fellabaum. | |
| 2,709,066 | 5/55 | Stapleton | 254—94 |
| 2,894,650 | 7/59 | Black et al. | |

FOREIGN PATENTS

| 871,431 | 6/61 | Great Britain. |
| 405,909 | 9/43 | Italy. |

HUGO O. SCHULZ, *Primary Examiner.*

GERALD M. FORLENZA, *Examiner.*